United States Patent
Cheung (10) Patent No.: US 8,495,100 B2
(45) Date of Patent: Jul. 23, 2013

(54) SEMANTIC VERSION CONTROL SYSTEM FOR SOURCE CODE

(75) Inventor: Lik Cheung, Albany, CA (US)

(73) Assignee: International Business Machines Corporation, Armonk, NY (US)

( * ) Notice: Subject to any disclaimer, the term of this patent is extended or adjusted under 35 U.S.C. 154(b) by 1480 days.

(21) Appl. No.: 11/940,940

(22) Filed: Nov. 15, 2007

(65) Prior Publication Data

US 2009/0133006 A1    May 21, 2009

(51) Int. Cl.
*G06F 7/00* (2006.01)
*G06F 17/30* (2006.01)

(52) U.S. Cl.
USPC .............................. 707/794; 707/755; 717/143

(58) Field of Classification Search
USPC .................... 717/143; 707/755, 794
See application file for complete search history.

(56) References Cited

U.S. PATENT DOCUMENTS

| | | |
|---|---|---|
| 6,275,223 B1 | 8/2001 | Hughes |
| 6,792,595 B1* | 9/2004 | Storistenau et al. .......... 717/110 |
| 6,874,140 B1 | 3/2005 | Shupak |
| 7,013,460 B2 | 3/2006 | Thompson et al. |
| 2003/0023957 A1 | 1/2003 | Bau, III et al. |
| 2003/0110472 A1 | 6/2003 | Alloing et al. |
| 2004/0154000 A1* | 8/2004 | Kasravi et al. ................. 717/130 |
| 2005/0021689 A1 | 1/2005 | Marvin et al. |
| 2006/0048093 A1 | 3/2006 | Jain et al. |
| 2006/0225053 A1 | 10/2006 | Lakshman et al. |
| 2006/0271917 A1 | 11/2006 | Das et al. |
| 2006/0294502 A1 | 12/2006 | Das et al. |
| 2007/0011659 A1* | 1/2007 | Venolia ......................... 717/127 |
| 2007/0055965 A1 | 3/2007 | Colyer |
| 2007/0256054 A1* | 11/2007 | Byrne et al. ................... 717/113 |

OTHER PUBLICATIONS

German et al., "Using Evolutionary Annotations from Change Logs to Enhance Program Comprehension", MSR'06, May 2006, Shanghai, China, pp. 159-162.
Szymczyk, "Version Control with Subversion and Xcode", Jun. 21, 2006, pp. 1-8. retrieved Nov. 1, 2007. http://www.meandmark.com/subversion.pdf.

* cited by examiner

*Primary Examiner* — Alexey Shmatov
(74) *Attorney, Agent, or Firm* — Yee & Associates, P.C.; David A. Mims, Jr.

(57) ABSTRACT

A computer implemented method and computer usable program product for version control of source code. In one embodiment, a source code file is scanned for relationships between source code sections. A semantic graph with dependencies and metadata describing the source code sections is constructed. The dependencies indicate the relationships between the source code sections. If changes are received for the semantic graph, the semantic graph is modified with the changes to form a modified semantic graph.

14 Claims, 5 Drawing Sheets

SEMANTIC VERSION CONTROL SYSTEM FOR SOURCE CODE

BACKGROUND OF THE INVENTION

1. Field of the Invention

The present invention is related generally to an improved data processing system and in particular to version control for source code. More particularly, the present invention is directed to a computer implemented method and computer usable program product for utilizing semantic version control to track dependencies between source code sections.

2. Description of the Related Art

Source code is a sequence of statements that is usually written in a high level programming language, such as, without limitation, C programming language, C++, or Java™. Source code is usually stored in one or more text files until the code is compiled and executed. As a program is designed and developed, frequently multiple versions of the same program are deployed at different sites for utilization by multiple program developers. In such a case, a single document or section of code is often edited by members of a team. These team members may be located in different physical locations and making updates to the source code without consultation with the other members of the team. In these situations, version control systems are frequently used to track and account for ownership of updates and changes to documents and code.

Version control is the management of multiple revisions to a source code file by multiple developers. Version control is most commonly used in engineering and software development to manage ongoing development of digital documents such as source code, art resources, blueprints, electronic models, and other critical information that may be worked on by a team of people. Tools for version control are frequently necessary for the organization of multi-developer projects.

Current version control systems for tracking changes in source code rely on tracking comments made by developers when they commit changes to their source code. These comments are attached to a change-set in files associated with the source code, such as, without limitation, comments saved to a change set in the source code repository. The change set is a file that identifies a set of changes made in a single commit. A commit occurs when a copy of the changes made to the working copy is written or merged into the source code repository. The source code repository is a repository where current and historical file data associated with the source code is stored.

Another version control system tracks changes to source code by tracking changes to filenames and line numbers. However, these current version control systems require developers to read through many sets of comments, even if the comments are unrelated to the developer's workflow. Moreover, the comments retained in the source code file are often not useful in helping developers isolate problems when refactoring or integrating existing code. Refactoring code is any change to a computer program's code which improves its readability or simplifies its structure without changing results generated by the program code at execution of the code.

Additionally, these version control systems lack any visual display of the relationships between the source code sections. Source code is often lengthy and very detailed. Comments that are saved often only indicate that a certain section has been changed, without providing a reason for the change. Over time, a developer may be unable to remember the reason why certain changes were made. Thus, the code base becomes less maintainable.

SUMMARY OF THE INVENTION

The illustrative embodiments described herein provide a computer implemented method and computer usable program product for version control of source code. In one embodiment, a source code file is scanned for relationships between source code sections. A semantic graph with dependencies and metadata describing the source code sections is constructed. The dependencies indicate the relationships between the source code sections. If changes are received for the semantic graph, the semantic graph is modified with the changes to form a modified semantic graph.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
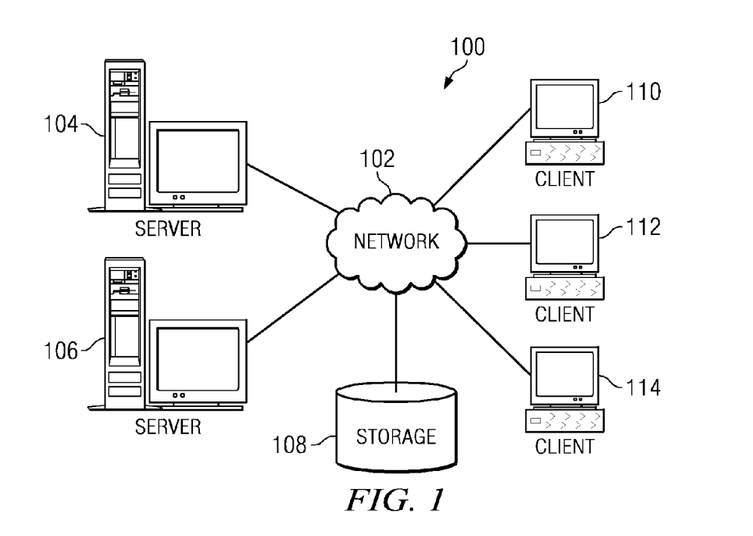
FIG. 1 is a pictorial representation of a network of data processing systems in which illustrative embodiments may be implemented.
Figure 2:
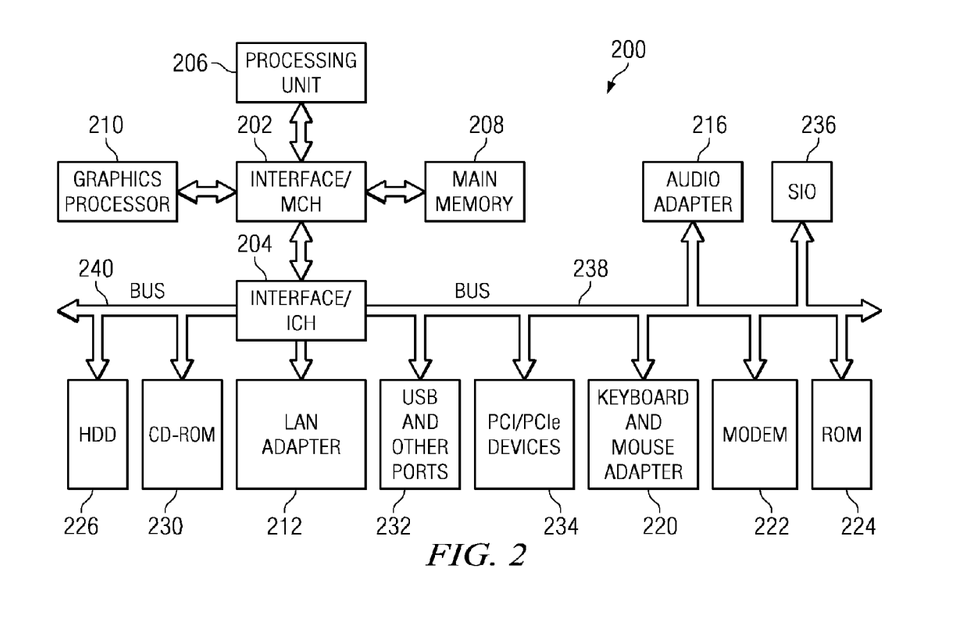
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example.

In this example, clients 110, 112, and 114 are clients used by a set of developers to generate and/or modify source code. The illustrative embodiments provide a semantic version controller that tracks the changes and updates made by the one or more developers in the set of developers at clients 110, 112, and 114. The semantic version controller generates a semantic graph showing the dependencies and metadata associated with updates and changes to the source code. The set of developers access the semantic graph and receive notifications regarding changes and updates to the source code via network 102. Network data processing system 100 may include additional servers, clients, and other devices not shown In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including interface and memory controller hub (interface/MCH) 202 and interface and input/output (I/O) controller hub (interface/ICH) 204. Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to the interface/MCH through an accelerated graphics port (AGP), for example.

In the depicted example, local area network (LAN) adapter 212 is coupled to interface and I/O controller hub 204 and audio adapter 216, keyboard and mouse adapter 220, modem 222, read only memory (ROM) 224, universal serial bus (USB) and other ports 232, and PCI/PCIe devices 234 are coupled to interface and I/O controller hub 204 through bus 238, and hard disk drive (HDD) 226 and CD-ROM 230 are coupled to interface and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to interface and I/O controller hub 204.

An operating system runs on processing unit 206 and coordinates and provides control of various components within data processing system 200 in FIG. 2. The operating system may be a commercially available operating system such as Microsoft® Windows Vista™ (Microsoft and Windows Vista are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in interface and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

A source code file oftentimes requires many editions and revisions. Developers need a method to visualize how these editions and revisions affect various components of the source code file. Additionally, projects usually involve multiple developers, not all of whom are located in the same geographical location. Currently, most version control systems rely on comments saved by a developer to the source code repository to understand the incremental evolution of a source code file and any changes that are made. However, the illustrative embodiments recognize that these comments are not useful without a further tool for analysis and organization of the comments. The illustrative embodiments recognize a need for a data processing method that is capable of annotating changes in source code by focusing on the semantics of the code, as well as relationships between source code sections. Therefore, the illustrative embodiments provide a computer implemented method and computer program product for semantic version control of source code.

Therefore, the illustrative embodiments provide a semantic graph that tracks the dependencies between various source code sections within a source code file to allow the developers to visualize the relationships between different source code sections graphically. This semantic graph aids in code development and code maintenance In one embodiment, a source code file is identified in the source code repository. Identifying the source code file could be identified by a user manually selecting the file, the process automatically scanning for the file, the process identifying a newly created source code file, a user downloading a file from a server, or the process downloading a file off the Internet. Next, the source code file is scanned for relationships between source code sections. The source code file may be scanned by either software or an appropriate set of developers. As used herein, the term set refers to one or more. Thus, a set of developers could include a single developer, as well as two or more developers.

In response to scanning the source code repository and locating a source code file, then the source code file is scanned for relationships between the source code sections. A semantic graph is constructed with the dependencies and the metadata between the source code sections. In this illustrative embodiment, the dependencies indicate the relationships between the source code sections. The source code sections include but are not limited to classes, methods, functions, variables, constants, instances, and other structures. The term metadata, as used herein, includes but is not limited to, semantic graph relationships, timestamps, source code changes, developer comments, and other customizable additional fields.

In accordance with this illustrative embodiment, in response to receiving changes from a set of developers, the semantic graph is modified with the changes to form a modified semantic graph. Thus, the initial semantic graph is reviewed by a set of developers for any incorrect or missing dependencies. The set of developers modifies the semantic graph by submitting changes to the semantic graph in the form of additions and/or deletions of dependencies on the semantic graph. Upon forming the modified semantic graph, the modified semantic graph is stored to the source code repository. A source code repository is a location for storing source code files and semantic graphs, as well as other modifications or comments.

In another illustrative embodiment, a set of developers are notified of the storage location of the modified semantic graph. In this illustrative embodiment, the set of developers may comprise at least one developer whose workflows are affected by the source code sections. The set of developers are the same as the appropriate set of developers. This term includes at least one developer assigned to at least one of the source code sections on the modified semantic graph. The term assigned to the source code sections, as used herein, encompasses any one who is either working on, affiliated with, assigned to review, or a developer that is curious about the development of the source code file and wants to receive notice of the semantic graph. As discussed above, source code is often developed by many developers, who are then assigned individual sections of the source code. This illustrative embodiment allows developers to focus on source code sections of relevance to them. One advantage of such an embodiment includes greater efficiency and comprehension between developers while working on a source code file. Another advantage of the present invention is that this process does not significantly change a developer's workflow.

Figure 3:
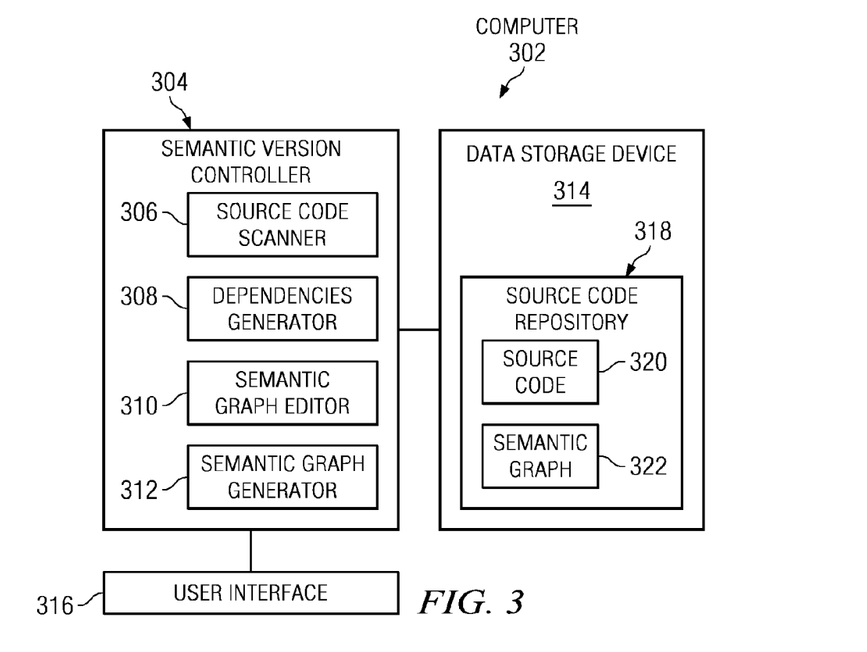
FIG. 3 is a block diagram illustrating a data flow through a semantic version controller in accordance with an illustrative embodiment.

FIG. 3 is a block diagram illustrating a data flow through a semantic version controller in accordance with an illustrative embodiment. Computer 302 may be implemented in any type of computing device, such as a personal computer, laptop, personal digital assistant, a server, a remote desktop computer, cellular telephone, personal digital assistant, or a remote server or any other computing device depicted in FIGS. 1 and 2.

Semantic version controller 304 is a software component for generating a semantic graph. Semantic version controller 304 can also be located on removable storage, such as, without limitation, a floppy disk, a compact disc (CD), a flash memory, or a memory stick. Semantic version controller 304 is composed of but not limited to, source code scanner 306, dependencies generator 308, semantic graph editor 310, and semantic graph generator 312.

Source code scanner 306 scans the source code repository for a source code file. Dependencies generator 308 generates dependencies that are used by the semantic graph generator 312. The semantic graph generator 312 generates the semantic graph containing vertices and edges. The vertices, as previously discussed, are a geometric shape and the edges are directional paths indicating dependencies between vertices. Semantic graph generator 312 uses dependencies generator 308 while generating the semantic graph. Semantic graph editor 310 allows a developer or other process to modify the semantic graph, by adding or deleting vertices and edges to track dependencies.

User interface 316 allows a user to edit the semantic graph by entering the user's changes into semantic graph editor 310. Semantic graph generator 312 may have committed errors in generating the semantic graph and thus a user may use user interface 316 to modify the semantic graph. Data storage device 314 may be any form of data storage device, including but not limited to, USB stick. A data storage device, may include, but is not limited to, tape libraries, disk array controllers, tape drives, flash memory, a hard disk, and/or any other type of storage device for storing data. Source code repository 318 is located within data storage device 314. Source code repository 318 is a location for storing source code files and semantic graphs, as well as other modifications or comments. Source code repository 318 comprises, but is not limited to, source code 320 and semantic graph 322. Source code 320 is a source code file stored within the source code repository 318. Semantic graph 322 is the semantic graph that is generated by semantic graph generator 312 and that may be modified by semantic graph editor 310.

In the illustrative embodiments discussed thus far, the invention may be used for projects with an existing source code base. In another illustrative embodiment, this invention may be used for projects with an empty source code repository. This situation will occur for projects in the initial stage of development that are without any generated code at this initial stage. In this embodiment, a blank semantic graph is created in response to scanning the source code repository and not locating a source code file without a semantic graph associated with the source code file. In other words, if all the source code files already have a semantic graph associated with each source code file, a blank semantic graph is not created. However, if a source code file without an associated semantic graph is identified, a blank semantic graph is created and associated with the identified source code file. As new source code files are added, each new file will be scanned, and dependencies inferred.

In another embodiment, a developer manually triggers creation of a blank semantic graph when the developer begins writing source code for a new program. In yet another embodiment, when a new source code file is created, a blank semantic graph is automatically created for the newly created source code file. In this case, the blank semantic graph is associated with the newly created source code file immediately upon creation of the new source code file.

The blank semantic graph is stored in the source code repository. As source code sections are created for the source code file, dependencies and metadata are added to the blank semantic graph. The dependencies may be set up either manually by the user or automatically by a software program or a network provider. Dependencies are indicated by edges connecting vertices that contain source code sections and metadata.

The illustrative embodiments may be performed as a service to customers. In this embodiment, a source code file exists in a source code repository. In this example, a client such as client 110, in FIG. 1, sends source code files to a server associated with the service provider by the server, such as server 104 in FIG. 1. The source code file is scanned for relationships between source code sections.

A semantic graph of dependencies and metadata between source code sections is constructed. The dependencies indicate the relationships between source code sections. The metadata is entered by a set of developers to describe the source code sections. The semantic graph is transmitted from the server back to the client. This service may be performed for a fee or other compensation. Once returned to the client, a set of developers may review the semantic graph and submit any changes to the server to be made to the semantic graph. The changes are made to the semantic graph and in response to receiving the changes, the semantic graph is modified.

The modified semantic graph is transmitted from the server back to the client. The modified semantic graph is stored in the source code repository. The service also may be performed by automation in which a process automatically performs the illustrative embodiments wholly without human intervention. The process may also be performed manually by human users analyzing the source code. The process may also be implemented in part by human users and in part by computer hardware and software.

In another illustrative embodiment, a class of hierarchies is created for source code that is being committed. A class is user-defined data and a collection of objects that share a set of characteristics. To commit the source code is to physically update the source code to a record. Metadata is stored in the storage backend. The term backend as used herein, refers to the support components of a computer system. This includes, without limitation, the database management system (DBMS). Metadata includes, but is not limited to timestamps, source code changes, a set of developer's comments, source code dependency changes, semantic graph relationships, test coverage statistics, and customizable additional fields. The metadata is updated on source code updates and commits. The metadata is distributed to a set of developers. The set of developers are notified when changes are made to the source code.

This embodiment provides a method for developers to keep track of semantic changes made to the source code and the relationships between those changes, rather than tracking line numbers and filenames of changed code or solely relying on metadata. In this example, semantic changes include modifications to classes, methods, functions, variables, constants, instances, and other structures. With metadata on the changes rather than the files, developers are able to see the reasoning behind the modifications to the code base. Changes in code are reflected as changes to the semantic graph. Developers will thus be able to infer potential source code problems from the relationships between the changes. Finally, since there are no restrictions on the types of metadata used to annotate source changes, developers can embed documentation and other supplementary media to add more meaning to the source changes.

Figure 4:
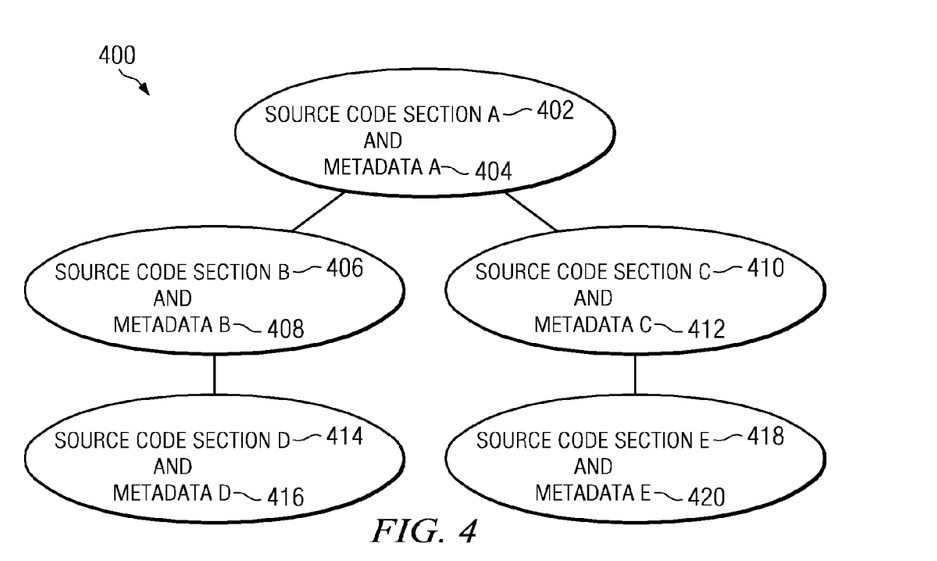
FIG. 4 is a block diagram of a semantic graph for illustrating dependencies and metadata for the source code sections in accordance with an illustrative embodiment.

FIG. 4 is a block diagram of a semantic graph for illustrating dependencies and metadata for the source code sections in accordance with an illustrative embodiment. 400 is a semantic graph in accordance with an illustrative embodiment. Semantic graph 400 comprises Source code section A 402, source code section B 406, source code section C 410, source code section D 414, and source code section E 418. These source code sections are the vertices of the semantic graph. The edges are the lines that connect the vertices.

The presence of an edge indicates that a dependency exists between the connected vertices. In this illustrative embodiment, the vertices are in the shapes of circles and the edges are lines. Source code section A 402 contains metadata A 404 that describes or relates to the section within a source code file that is categorized as source code section A 402. Metadata A can include developer comments, timestamps, semantic graph dependencies, source code dependency changes, and other customizable fields, as previously stated.

In this embodiment, a semantic graph is comprised of vertices and graph edges. The vertices describe the source code sections from the source code as well as metadata where the metadata is entered by a set of developers to describe the source code sections. Additionally, the vertices comprise a geometric shape. The shapes include circles, squares, and rectangles to name a few. The graph edges are directional paths drawn between the vertices. The graph edges indicate a dependency between the vertices. The graph edges may be represented as lines, lines with arrows, curved lines, or any other directional path leading from one vertice to another. The dependencies may exist between multiple vertices and be either unidirectional or bidirectional.

As can be seen in this example in FIG. 4, a dependency exists between source code section A 402 and source code section C 406, because an edge is connecting the two vertices. A dependency also exists between source code section A 402 and source code section C 406, as well as between source code section C 410 and source code section E 414, as well as between source code section B 406 and source code section D 414. No dependencies exist on semantic graph 400 between vertices that are not connected by an edge. For example, no dependencies exist between either source code section A 402 and source code section D 414 or source code section B 406 and source code section E 418, because no edges are connecting these vertices to each another.

If in fact a dependency actually exists between the vertices that are not already connected, then the semantic graph may be modified using user interface 316 and semantic graph editor 310 from FIG. 3. The modifications may be made by either manually by a developer or a client, or automatically by a software program.

Figure 5:
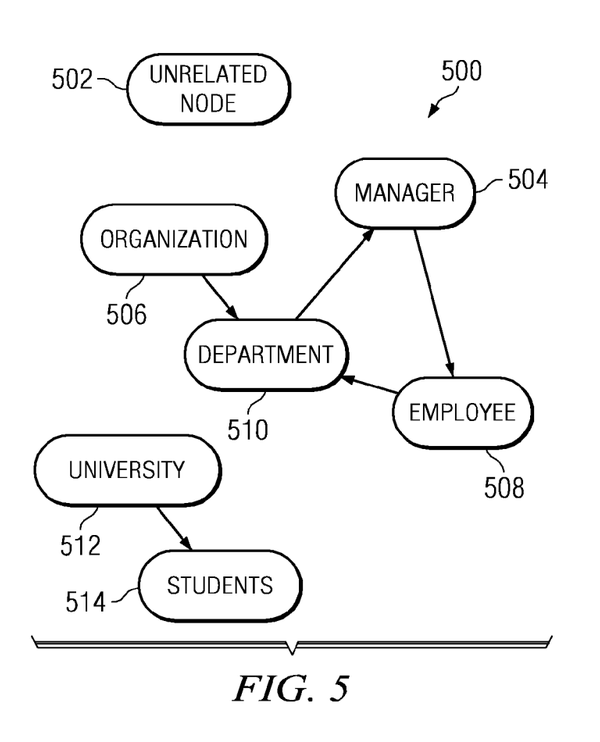
FIG. 5 is a block diagram of a semantic graph illustrating source code section associations on a semantic graph in accordance with an illustrative embodiment.

FIG. 5 is a block diagram of a semantic graph illustrating source code section associations on a semantic graph in accordance with an illustrative embodiment. 500 is a semantic graph in accordance with an illustrative embodiment. The directional paths between university 512 and students 514 are the edges of the semantic graph, while university 512 and students 514 are the vertices. FIG. 5 is an example of the method by which dependencies may be generated between words by focusing on the semantics of the word. For example, the semantics of the data models "University" and "Students" indicate that a dependency exists between these two vertices. However, no dependency exists between unrelated node 502 and any of the other vertices, because the semantics of the particular code section indicate that there is no relationship or connection between unrelated node 502 and the remaining vertices.

Similarly, the semantics of a source code section indicates dependencies that exist between it and other sections of a source code file. Dependencies generator 308 in FIG. 3 can focus on the semantics of a source code file to generate dependencies. However, as previously stated, the user may use user interface 316 to edit any dependencies included on a semantic graph using semantic graph editor 310.

Figure 6:
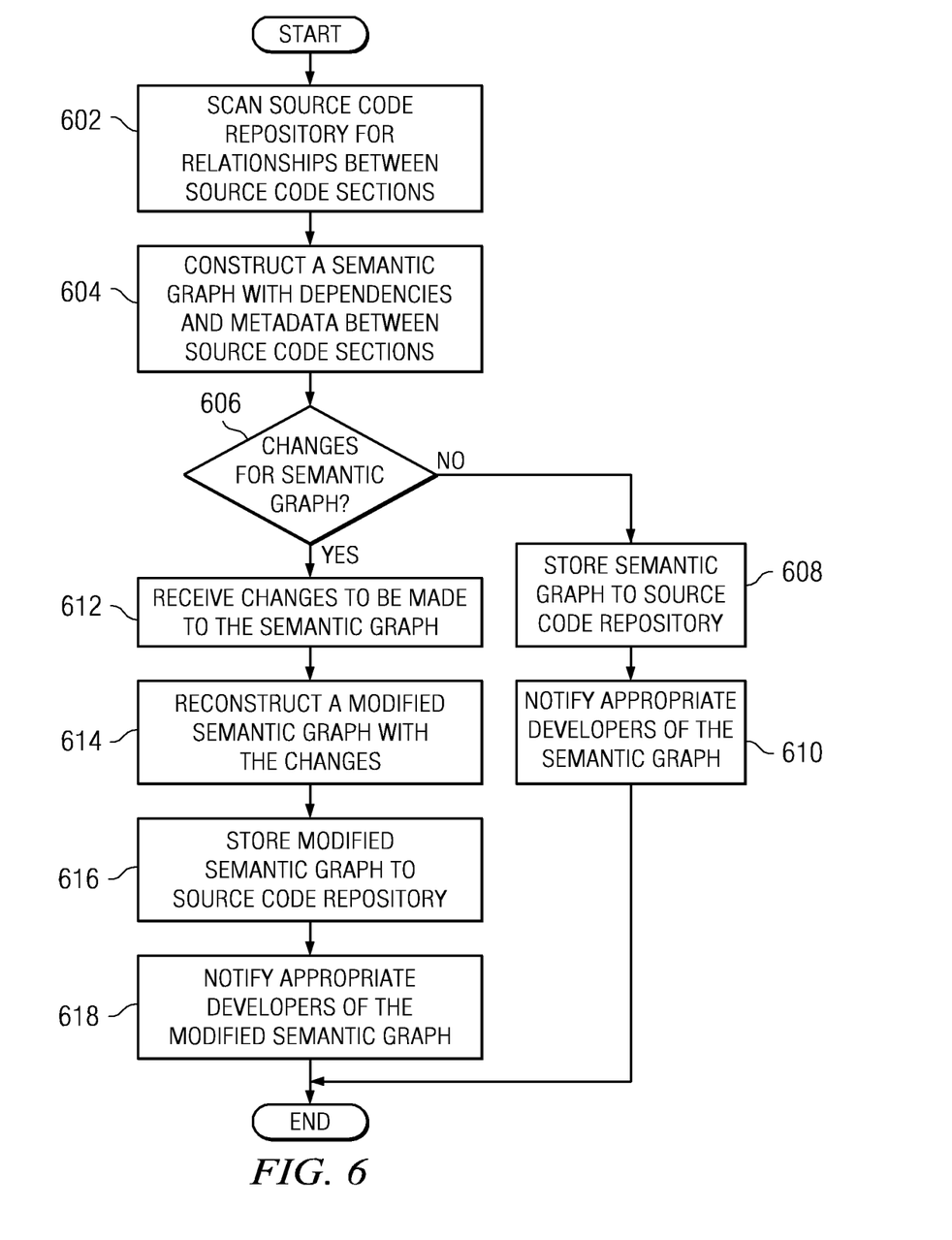
FIG. 6 is a flowchart illustrating a process for generating a semantic graph associated with a pre-existing source code file in accordance with an illustrative embodiment.

Referring to FIG. 6, a flowchart illustrating a process for generating a semantic graph for illustrating dependencies between source code sections for projects with an existing source code file in the source code repository is depicted in accordance with an illustrative embodiment. The process in FIG. 6 generates a semantic graph for a source code file. This process is implemented by a software component for generating a semantic graph for a source code file, such as semantic version controller 304 in FIG. 3.

The process starts by scanning the source code repository for relationships between source code sections (step 602). Next, the process constructs a semantic graph with dependencies and metadata between the source code sections (step 604). Next, the process makes a determination as to whether any changes are necessary (step 606). If no changes are necessary, the process stores the semantic graph into the source code repository (step 608).

Then, the process notifies appropriate developers of the semantic graph (step 610). The process terminates thereafter. If changes need to be made, the process receives the changes to be made to the semantic graph (step 612). The process then reconstructs a modified semantic graph with the changes (step 614). Next, the process stores the modified semantic graph to the source code repository (step 616). The process notifies appropriate developers of the modified semantic graph (step 618). The process terminates thereafter.

Figure 7:
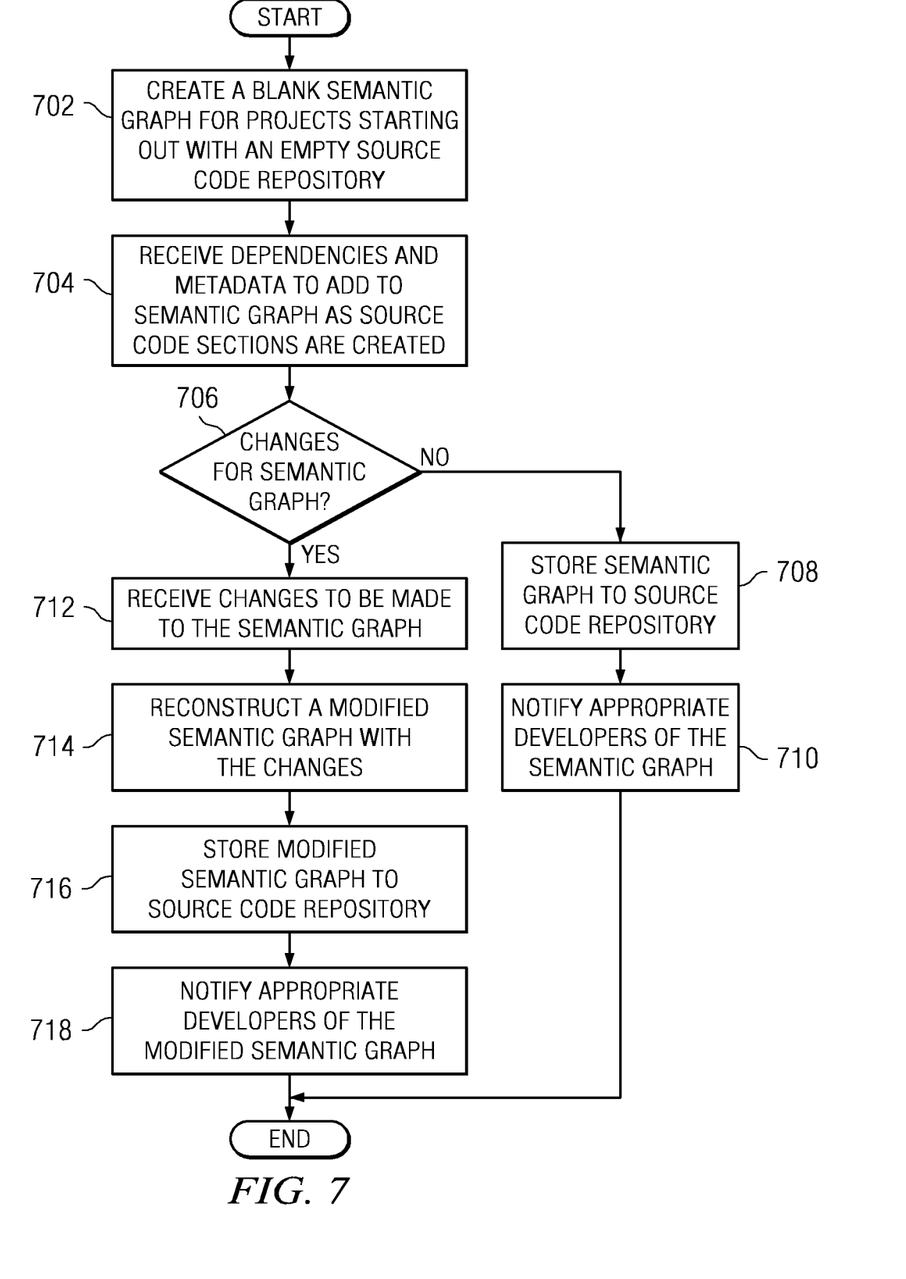
FIG. 7 is a flowchart illustrating a process for generating a semantic graph as source code is being generated in accordance with an illustrative embodiment.

FIG. 7 is a flowchart illustrating a process for generating a semantic graph for illustrating dependencies between source code sections for projects starting out with an empty source code repository in accordance with an illustrative embodiment. The process is implemented by a software component for generating a semantic graph for a source code file, such as semantic version controller 304 in FIG. 3.

The process starts by creating a blank semantic graph for projects starting out with an empty source code repository (step 702). Next, the process receives dependencies and metadata to add to the semantic graph as source code sections are created (step 704). Next, the process makes a determination as to whether any changes are necessary (step 706). If no changes are necessary, the process stores the semantic graph into the source code repository (step 708).

Then, the process notifies appropriate developers of the semantic graph (step 710). The process terminates thereafter. If changes need to be made, the process receives the changes to be made to the semantic graph (step 712). The process then reconstructs a modified semantic graph with the changes (step 714). Next, the process stores the modified semantic graph to the source code repository (step 716). The process notifies appropriate developers of the modified semantic graph (step 718). The process terminates thereafter.

Figure 8:
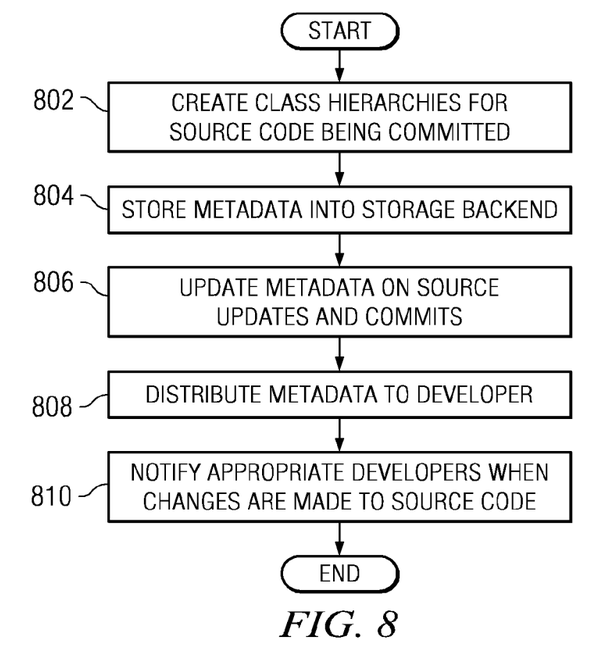
FIG. 8 is a flowchart illustrating a process for notifying developers when a semantic graph indicates changes have been made to source code in accordance with an illustrative embodiment.

FIG. 8 is a flowchart illustrating pseudo-code for generating a semantic graph illustrating the dependencies between source code sections in accordance with an illustrative embodiment. The process is implemented by software component for generating a semantic graph for a source code file, such as semantic version controller 304 in FIG. 3.

The process starts by creating class hierarchies for source code being committed (step 802). Next, the metadata is stored into the storage backend (step 804). The metadata is then updated on source updates and commits (step 806). The metadata is then distributed to the developers (step 808). The appropriate developers are notified when changes are made to the source code (step 810) and the process terminates thereafter.

The illustrative embodiments have been described as being implemented to generate a semantic graph for source code. However, the illustrative embodiments are not limited to source code. Version control systems are often used by software developers to maintain documentation and configuration files as well as source code. Therefore, the present invention may also be implemented for documentation and configuration files.

The illustrative embodiments provide a computer implemented method and computer usable program product for semantic version control of source code. In one embodiment, a source code file is scanned for relationships between source code sections within the source code file. If no source code file exists, then a blank semantic graph is created and stored in the source code repository. As source code sections are added, the blank semantic graph is modified to reflect these changes. A semantic graph is constructed with dependencies and metadata describing the source code sections. The dependencies indicate the relationships between the source code sections. The semantic graph is comprised of vertices and edges. The vertices comprise a geometric shape and the edges comprise directional paths connecting the vertices to one another. The term metadata, as used herein, includes but is not limited to, semantic graph relationships, timestamps, source code changes, developer comments, and other customizable additional fields. In response to receiving changes for the semantic graph, the semantic graph is modified with the changes to form a modified semantic graph.

Thus, the illustrative embodiments solve the problems associated with source code version control by providing a semantic graph to assist developers in creating, editing, and analyzing source code. The semantic graph provides a more efficient alternative to the current version control techniques by providing a visual explanation of dependencies between source code sections. Source code files are often lengthy, detailed, and require many revisions and editions. The maintenance of code over time is difficult and as numerous developers, often in different geographic locations, work on individual sections of the source code and make updates to the source code without consultation with the other members of the team. However, the illustrative embodiment of this invention provides developers with a better understanding of the relationships between source code sections, because the developers are able to visualize any changes made by using the metadata and the edges located on the semantic graph.

Additionally, a semantic graph is easily stored, transmitted, and accessed by multiple developers working on a source code file. Thus, the illustrative embodiments enable developers to focus on source code sections of relevance to them.

The flowchart and block diagrams in the figures track the architecture, functionality, and operation of possible implementations of systems, methods, and computer program products according to various embodiments. In this regard, each block in the flowchart or block diagrams may represent a section, segment, or portion of code, which comprises one or more executable instructions for implementing the specified logical function(s). It should also be noted that, in some alternative implementation, the functions noted in the steps may occur out of the order noted in the figures. For example, two steps shown in succession may, in fact, be executed substantially concurrently, or the steps may sometimes be executed in reverse order, depending on the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk, millipede storage technology, Magneto-resistive random access memory (MRAM), or phase-change memory, also known as PCM, PRAM, Ovonic Unified Memory, and Chalcogenide RAM (C-RAM). Current examples of optical disks include compact disk-read only memory (CD-ROM), compact disk-read/write (CD R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for semantic version control of source code, the computer implemented method comprising:
    scanning, by a computer, a source code file for semantic relationships between source code sections within the source code file;
    generating dependencies, by a dependency generator, between the source code sections using the semantic relationships of the source code sections;
    constructing a semantic graph by the computer using the dependencies and associated metadata describing a respective section of the source code sections individually, wherein the dependencies indicate the semantic relationships between the source code sections and wherein the metadata includes semantic graph relationships and developer comments entered by a set of developers, wherein the set of developers comprises at least one appropriate developer to receive a notification, wherein an appropriate developer is one who wants to receive notice of a change to the semantic graph including a developer whose workflow is affected by the source code sections and, wherein the semantic graph comprises vertices and graph edges, wherein the vertices describe the source code sections and include the metadata applicable to each respective source code section, wherein the vertices are a geometric shape and the graph edges are directional paths between the vertices that track a dependency between the vertices;
    creating a blank semantic graph, by the computer, for projects that do not have an existing source code file in the source code repository and storing the blank semantic graph in the source code repository;
    responsive to receiving dependency changes for the semantic graph through a user interface of a semantic graph editor, modifying the semantic graph with the dependency changes to add or delete one or more vertices and graph edges of the semantic graph to form a modified semantic graph, wherein the modifying the semantic graph includes making the dependency changes on the semantic graph through a user interface of a semantic graph editor and modifying the blank semantic graph by adding dependencies to the blank semantic graph as source code classes are created for the projects that do not have the existing source code file in the source code repository;
    storing the modified semantic graph by the computer in the source code repository; and
    notifying, by the computer, the set of developers of the modified semantic graph.

2. The computer implemented method of claim 1, wherein the dependency changes are provided by a set of developers, wherein the set of developers comprises at least one appropriate developer to receive a notification, wherein the at least one appropriate developer is one who wants to receive notice of a change to the semantic graph including a developer whose workflow is affected by the source code sections by at least one of being assigned to work on, to review or is affiliated with, at least one of the source code sections.

3. The computer implemented method of claim 2, further comprising:
    identifying the source code file in a source code repository; and
    notifying the at least one appropriate developer in a set of developers of the modified semantic graph.

4. The computer implemented method of claim 1, wherein the vertices describe the source code sections from the source code and include the metadata applicable to each respective source code section wherein the metadata includes information comprising at least one of semantic graph relationships, timestamps, source code changes, developer comments and a customizable field.

5. The computer implemented method of claim 4, wherein the vertices comprise a geometric shape and wherein the edges are directional paths drawn between the vertices that track a dependency between the vertices wherein a dependency exists between two or more vertices and be one of unidirectional or bidirectional.

6. The computer implemented method of claim 1, further comprising:
 determining whether the source code file is located;
 responsive to scanning a source code repository and not locating the source code file, creating a blank semantic graph;
 storing the blank semantic graph in the source code repository;
 adding the dependencies and the metadata to the blank semantic graph as the source code sections are created for a new source code file;
 responsive to scanning the source code repository and locating the source code file without an associated semantic graph creating the blank semantic graph; and
 associating the blank semantic graph with the source code file located.

7. A computer program product for semantic version control, the computer program product comprising:
 a non-transitory computer readable storage medium;
 program code stored on the non-transitory computer readable storage medium for scanning a source code file by a computer for semantic relationships between source code sections;
 program code stored on the non-transitory computer readable storage medium for generating dependencies, by a dependency generator, between source code sections using the semantic relationships of the source code sections;
 program code stored on the non-transitory computer readable storage medium for constructing a semantic graph by the computer using the dependencies and associated metadata describing a respective section of the source code sections individually, wherein the dependencies indicate the semantic relationships between the source code sections and wherein the metadata includes semantic graph relationships and developer comments entered by a set of developers, wherein the set of developers comprises at least one appropriate developer to receive a notification, wherein an appropriate developer is one who wants to receive notice of a change to the semantic graph including a developer whose workflow is affected by the source code sections and, wherein the semantic graph comprises vertices and graph edges, wherein the vertices describe the source code sections and include the metadata applicable to each respective source code section, wherein the vertices are a geometric shape and the graph edges are directional paths between the vertices that track a dependency between the vertices;
 program code stored on the non-transitory computer readable storage medium for creating a blank semantic graph, by the computer, for projects that do not have an existing source code file in the source code repository and storing the blank semantic graph in the source code repository; and
 program code stored on the non-transitory computer readable storage medium responsive to receiving dependency changes for the semantic graph, through a user interface of a semantic graph editor, for modifying the semantic graph with the dependency changes to add or delete one or more vertices and graph edges of the semantic graph to form a modified semantic graph, wherein the modifying the semantic graph includes making the dependency changes on the semantic graph through a user interface of a semantic graph editor and modifying the blank semantic graph by adding dependencies to the blank semantic graph as source code classes are created for the projects that do not have the existing source code file in the source code repository;
 storing the modified semantic graph by the computer in the source code repository; and
 notifying, by the computer, the set of developers of the modified semantic graph.

8. The computer program product of claim 7, wherein the changes are provided by a set of developers, wherein the set of developers comprises at least one appropriate developer to receive a notification, wherein the at least one appropriate developer is one who wants to receive notice of a change to the semantic graph including a developer whose workflow is affected by the source code sections la at least one of being assigned to work on, to review or is affiliated with, at least one of the source code sections.

9. The computer program product of claim 8, further comprising:
 program code stored on the non-transitory computer readable storage medium for identifying the source code file in a source code repository; and
 program code stored on the non-transitory computer readable storage medium for notifying the at least one appropriate developer in a set of developers of the modified semantic graph.

10. The computer program product of claim 7, wherein the vertices describe the source code sections from the source code and include the metadata applicable to each respective source code section wherein the metadata includes information comprising at least one of semantic graph relationships, timestamps, source code changes, developer comments and a customizable field.

11. The computer program product of claim 10, wherein the vertices comprise a geometric shape and wherein the edges are directional paths drawn between the vertices that illustrate a dependency between the vertices wherein a dependency exists between two or more vertices and be one of unidirectional or bidirectional.

12. The computer program product of claim 7, further comprising:
 program code stored on a non-transitory computer readable storage medium for determining whether the source code file is located;
 program code stored on a non-transitory computer readable storage medium for creating a blank semantic graph for projects that do not have the source code file in a source code repository;
 program code stored on a non-transitory computer readable storage medium for storing the blank semantic graph in the source code repository;
 program code stored on a non-transitory computer readable storage medium for adding the dependencies and the metadata to the blank semantic graph as source code sections are created for a new source code file;
 program code stored on a non-transitory computer readable storage medium for creating the blank semantic graph for the source code file located without an associated semantic graph; and program code stored on a non-transitory computer readable storage medium for associating the blank semantic graph with the source code file located.

13. A computer implemented method for semantic version control, the computer implemented method comprising:
  a computer identifying a source code file in a source code repository;
  the computer scanning the source code file for semantic relationships between source code classes;
  the computer generating dependencies between the source code classes using the semantic relationships of the source code classes;
  the computer constructing a semantic graph, using the dependencies and associated metadata describing a respective source code class, between the source code classes, wherein the dependencies indicate the semantic relationships between the source code classes and, wherein the metadata includes semantic graph relationships and developer comments entered by a set of developers, wherein the set of developers comprises at least one appropriate developer to receive a notification, wherein an appropriate developer is one who wants to receive notice of a change to the semantic graph including a developer whose workflow is affected by the source code classes and, wherein the semantic graph comprises vertices and graph edges, wherein the vertices describe the source code sections and include the metadata applicable to each respective source code class, wherein the vertices are a geometric shape and the graph edges are directional paths between the vertices that track a dependency between the vertices;
  the computer creating a blank semantic graph for projects that do not have an existing source code file in the source code repository and storing the blank semantic graph in the source code repository;
  the computer responsive to receiving dependency changes from the set of developers through a user interface of a semantic graph editor, modifying the semantic graph with the dependency changes to add or delete one or more of the vertices and graph edges of the semantic graph to form a modified semantic graph, wherein the modifying the semantic graph includes making the dependency changes on the semantic graph through a user interface of a semantic graph editor and modifying the blank semantic graph by adding dependencies to the blank semantic graph as source code classes are created for the projects that do not have the existing source code file in the source code repository;
  the computer storing the modified semantic graph in the source code repository; and
  the computer notifying the set of developers of the modified semantic graph.

14. An apparatus for semantic version control of source code, the apparatus comprising:
  one or more controller hubs;
  a memory connected to the one or more controller hubs, wherein the memory contains executable instructions;
  one or more processors connected to the one or more controller hubs, wherein the one or more processors execute the executable instructions to direct the apparatus to:
  scan a source code file for semantic relationships between source code sections within the source code file;
  generate dependencies between the source code sections using the semantic relationships of the source code sections;
  construct a semantic graph using the dependencies and associated metadata describing a respective section of the source code sections individually, wherein the dependencies indicate the semantic relationships between the source code sections and wherein the metadata includes semantic graph relationships and developer comments entered by a set of developers, wherein the set of developers comprises at least one appropriate developer to receive a notification, wherein an appropriate developer is one who wants to receive notice of a change to the semantic graph including a developer whose workflow is affected by the source code classes and, wherein the semantic graph comprises vertices and graph edges, wherein the vertices describe the source code sections and include the metadata applicable to each respective source code class, wherein the vertices are a geometric shape and the graph edges are directional paths between the vertices that track a dependency between the vertices;
  create a blank semantic graph for projects that do not have an existing source code file in the source code repository and store the blank semantic graph in the source code repository;
  responsive to receiving dependency changes for the semantic graph through a user interface of a semantic graph editor, modify the semantic graph with the dependency changes to add or delete one or more vertices and graph edges of the semantic graph to form a modified semantic graph, wherein the modifying the semantic graph includes making the dependency changes on the semantic graph on a user interface of a semantic graph editor and modifying the blank semantic graph by adding dependencies to the blank semantic graph as source code classes are created for the projects that do not have the existing source code file in the source code repository
  store the modified semantic graph in the source code repository; and
  notify the set of developers of the modified semantic graph.

* * * * *